United States Patent [19]
Ostrowski

[11] 4,067,417
[45] Jan. 10, 1978

[54] SELF-ENERGIZING APPLIED WEDGE ACTUATOR

[75] Inventor: Piotr Ostrowski, West Midlands, England

[73] Assignee: Girling Limited, Birmingham, England

[21] Appl. No.: 639,764

[22] Filed: Dec. 11, 1975

[30] Foreign Application Priority Data

Dec. 27, 1974 United Kingdom ............... 55913/74

[51] Int. Cl.² ............................................ F16D 55/16
[52] U.S. Cl. .................... 188/71.4; 188/170; 188/343; 192/70
[58] Field of Search ..................... 188/71.3, 71.4, 72.7, 188/170, 343, 365; 192/70, 91 R, 93 A; 74/110

[56] References Cited

U.S. PATENT DOCUMENTS

| | | | |
|---|---|---|---|
| 2,501,578 | 3/1950 | Pointer | 188/365 |
| 2,720,943 | 10/1955 | Kershner et al. | 188/71.4 |
| 2,883,008 | 4/1959 | Lucker | 188/71.3 |
| 3,106,990 | 10/1963 | Kershner | 188/71.4 |
| 3,343,632 | 9/1967 | Kershner et al. | 188/71.4 |
| 3,362,506 | 1/1968 | Mossey | 188/343 |
| 3,554,331 | 1/1971 | Pollinger | 188/170 |
| 3,599,762 | 8/1971 | Cox et al. | 188/343 |
| 3,752,266 | 8/1973 | Chouings | 188/170 |
| 3,858,488 | 1/1975 | Newstead et al. | 188/170 |

FOREIGN PATENT DOCUMENTS

| | | | |
|---|---|---|---|
| 2,228,394 | 11/1974 | France | 188/343 |
| 940,563 | 3/1956 | Germany | 188/72.7 |
| 1,813,534 | 7/1969 | Germany | 188/343 |
| 1,277,345 | 6/1972 | United Kingdom | 188/71.4 |

*Primary Examiner*—George E. A. Halvosa
*Assistant Examiner*—Edward R. Kazenske
*Attorney, Agent, or Firm*—Scrivener, Parker, Scrivener & Clarke

[57] ABSTRACT

A self-energizing disc brake is operated by an actuator which moves spreading pressure plates angularly in opposite directions to apply rotatable friction discs to radial surfaces in a stationary housing, and the actuator comprises a wedge for separating lugs on the plates, a spring for urging the wedge in a direction to separate the lugs, and a piston working in a cylinder bore for urging the wedge in the opposite direction when the cylinder is pressurized.

1 Claim, 3 Drawing Figures

SELF-ENERGIZING APPLIED WEDGE ACTUATOR

SPECIFIC DESCRIPTION

This invention relates to improvements in self-energising disc brakes of the kind in which rotatable friction discs are adapted to be brought into engagement with opposed radial surfaces in a stationary housing by pressure plates located between the friction discs and centred by pilots on the housing. Balls are located in co-operating oppositely inclined recesses in the adjacent faces of the pressure plates and the application of the brake is initiated by moving the pressure plates angularly in opposite directions, the pressure plates then moving apart into engagement with the friction discs which are urged into engagement with the radial surfaces in the housing. The pressure plates are carried round with the friction discs until one is arrested by the engagement of a lug on the plate with a stop abutment in the housing and the continued angular movement of the other pressure plate provides a servo action.

Self-energising brakes of that kind are commonly used on tractors and like vehicles and are hereinafter called brakes of the kind set forth.

In some known brakes of the kind set forth angular movement of the pressure plates to initiate the application of the brake has been effected mechanically by a pair of toggle links connected between radially projecting lugs on the plates, a pull-rod being connected to the junction of the links. It has also been to initiate the application of the brake hydraulically, for example by an hydraulic piston and cylinder assembly which acts between the lugs. Such an hydraulic arrangement is generally not acceptable since the hydraulic system is pressurised at all times the brake is applied during normal service braking and for parking.

According to our invention in a disc brake of the kind set forth provided with an actuator for moving the pressure plates angularly in opposite directions, the actuator comprises a housing, transmission means movable into an operative advanced position to urge radially projecting lugs on the plates away from each other, a spring for urging the transmission means into the advanced position, and a piston working in a cylinder bore in the housing to urge the transmission means into a retracted position in opposition to the force in the spring when the cylinder bore is pressurised.

Conveniently the spring comprises a compression spring surrounding the housing, and one end of the piston which projects from the bore acts as an abutment for one end of the spring, an abutment for the opposite end being rigid with the housing and forming a stop for the piston when the cylinder bore is pressurised.

The transmission means may comprise a wedge movable in a generally radial direction between the radially projecting lugs on the plates with the wedge engaging with and movable angularly with respect to the inner end of the piston to accommodate the angular movement of the pressure plates when the brake is applied.

In one construction the wedge is in rocking engagement in a recess in the inner end of the piston and engages between rollers located in a cage which rollers are engageable in turn with oppositely inclined surfaces at the inner ends of opposed tappets guided in aligned transverse bores in the housing, the tappets being engageable at their outer ends with the radial lugs.

In such a construction a return spring acts on the wedge to locate it in engagement in the recess at all times.

In another construction the wedge is pivotally connected to the inner end of the piston and engages between a pair of rollers rotatable in the radial lugs.

Two embodiments of our invention are illustrated in the accompanying drawings in which.

Figure 1:
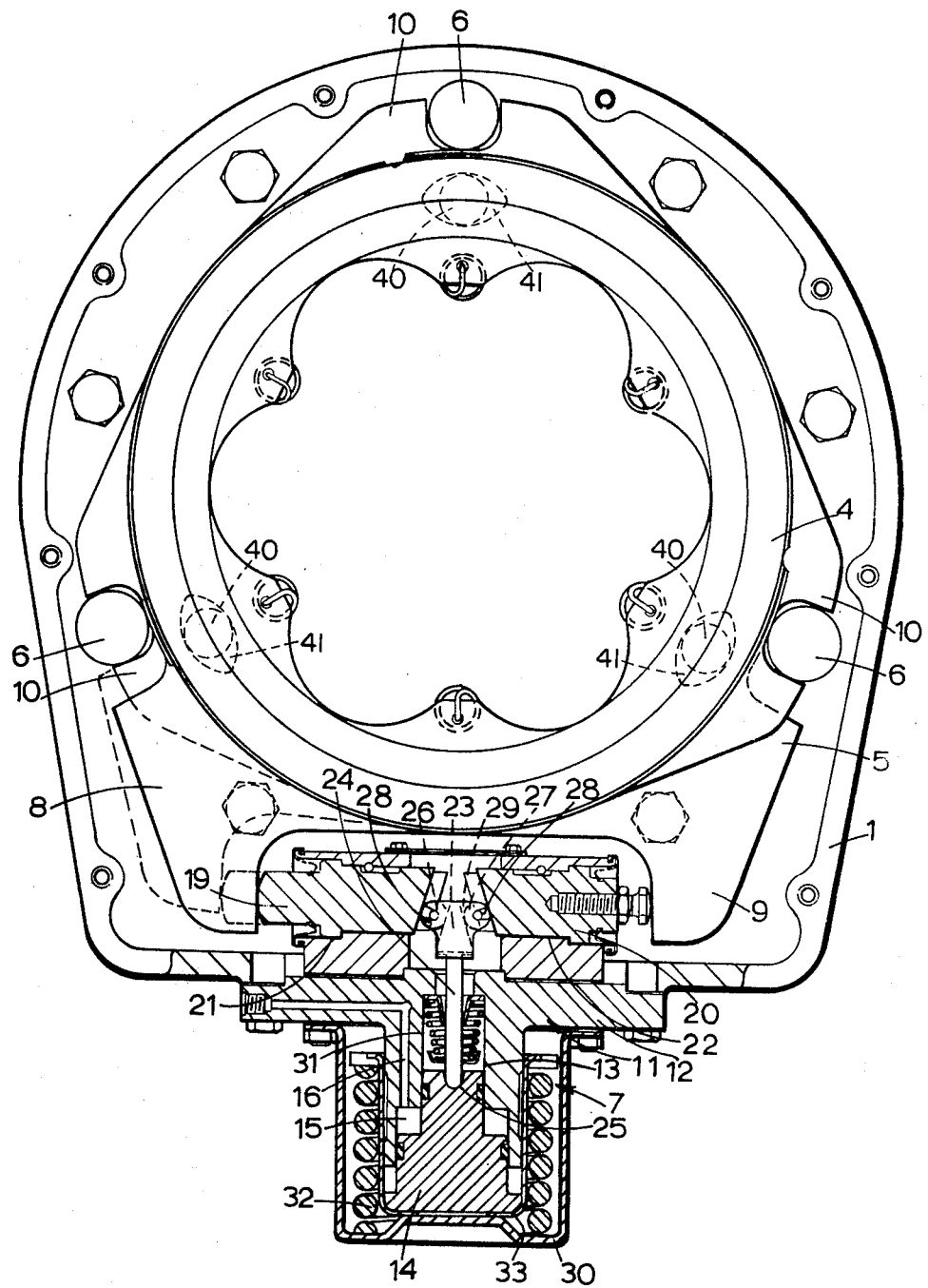
FIG. 1 is a transverse section through a self-energising disc brake of the kind set forth.
Figure 2:
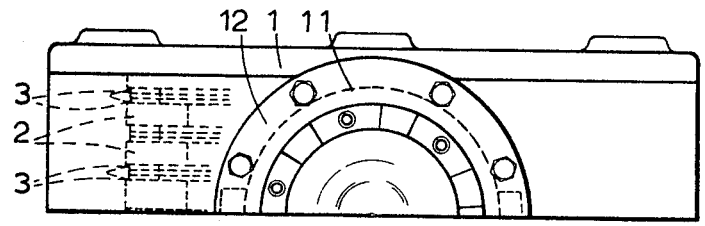
FIG. 2 is an elevation of one half of the actuator end of the brake.

The brake illustrated in FIGS. 1 and 2 is particularly adapted for braking a shaft or half shaft for transmitting drive to a wheel of a tractor or like vehicle. The brake comprises a housing 1 into which the shaft extends and discs 2 provided on opposite sides with rings 3 of friction material are splined or otherwise slidably keyed to the shaft.

Two angularly movable pressure plates 4 and 5 in the form of rings are located between the pair of discs 2 which is disposed at substantially the mid-point in the length of the housing 1, and balls 40 are located in oppositely inclined co-operating recesses 41 in adjacent faces of the plates 4, 5. The plates 4, 5 are centred on three angularly spaced pilots comprising pins 6 extending axially of the housing 1. Relative angular movement between the pressure plates 4, 5 to initiate application of the brake is produced by an actuator 7 which acts to separate radial lugs 8 and 9 on the plates.

When the lugs 8 and 9 are separated by the actuator the balls 40 tend to ride out of the recesses 41 to urge the plates apart so that the discs 2 are urged into engagement with each other and with relatively stationary braking surfaces comprises opposite ends of the housing 1 and the plates 4, 5 themselves. The pressure plates 4, 5 are carried round with discs 2 until one of the plates, for example the plate 5, is arrested by the engagement of lugs 10 on that plate with the pins 6 which act as torque taking stop abutments.

Continued angular movement of the other pressure plate 4 provides a servo action to intensify the braking force.

As illustrated the actuator 7 comprises a housing 11 projecting into the brake through an opening in the housing 1 and having a mounting flange 12 bolted to the housing 1 around the opening.

The housing 11 is provided with a stepped bore 13 of which the bore portion of greater diameter is located at the outer end of the housing 11. A stepped piston 14 works in the bore 13 and a chamber 15 defined in the bore 13 between the shoulders at the steps in diameter of the bore 12 and the piston 13 is connected to a supply of fluid under pressure, for example an hydraulic accumulator, through passage 16.

The inner end of the housing 11 is disposed between radial lugs 8 and 9 on the plates 4 and 5 respectively and opposed tappets 19, 20 engaging with the lugs 8 and 9 work in aligned transverse bores 21, 22 in the inner end of the housing 11. The tappets 19, 20 are adapted to be urged away from each other to initiate application of the brake by a wedge 23 on the inner end of a rod 24 which has a rocking engagement in a recess 25 in the end of the piston 14 which is of smaller diameter. The wedge 23 acts on the inner ends of the tappets 19 and 20 which are inclined towards each other in an inward direction through opposed rollers 26, 27 which, in turn, are rotatable in slots 28 of generally pear-shaped or quasi-triangular outline in a cage 29 into which the wedge 23 extends.

When the chamber 15 is pressurised the piston 14 is held in a retracted position with its outer end engaging with a stop comprising a stop member 30 of generally top-hat outline which encloses the outer end of the housing 11 and is bolted to the flange 12. The wedge 23 is also retracted by the force in a compression spring 31 which acts between the stem 24 and the housing 11 to maintain the inner end of the stem 24 within the base of the recess 25 at all times.

The stop member 30 also forms an abutment for the outer end of a compression spring 32 of which the inner end abuts against a flange at the inner end of thimble 33 on which the piston 14 acts and which slidably receives the outer end of the housing 11.

When the chamber 15 is pressurised to retract the piston 14 and the wedge 23, the compression spring 32 is held in a compressed condition. When the chamber 15 is de-pressurised the spring 32 extends to advance the piston 14 and the wedge 23 which in turn urges the tappets 19 and 20 apart to separate the lugs 8 and 9 as described above.

Movement of the plate 4 with the discs 2 to produce the servo action is accompanied by movement of the tappet 19 due to the force in the spring 32 which is compensated for by rocking movement of the stem 24 with respect to the piston 14.

Figure 3:
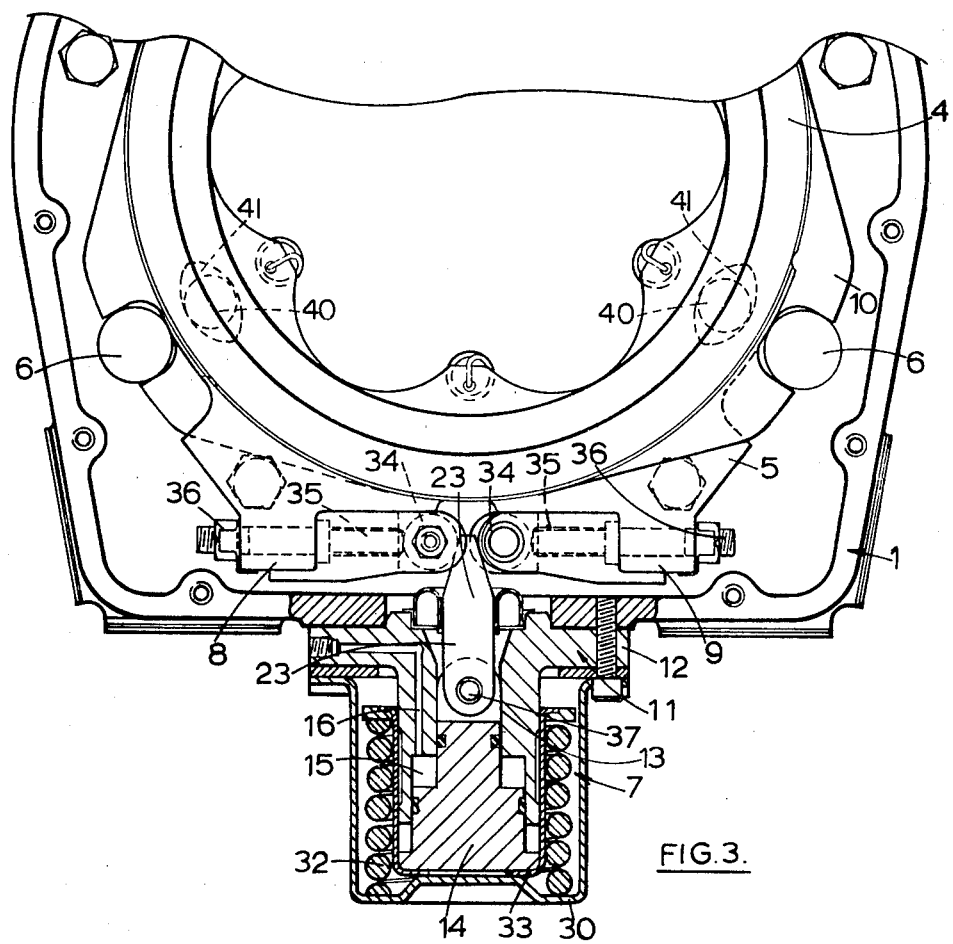
FIG. 3 is a transverse section similar to FIG. 1 of a part of a further brake of the kind set forth.

In the actuator of the brake shown in FIG. 3 of the drawings, the wedge 23 acts directly between rollers 34 journalled for rotation in tappets 35 which act on the lugs 8, 9 through manual adjusters 36. In this construction the wedge 23 is pivotally connected to the inner end of the piston 14, which is bifurcated, by means of a transverse pin 37. This eliminates the necessity of providing a return spring for the wedge 34 which is continuously retracted with the piston. Also the housing 11 is shorter as no guides for the tappets 35 are provided.

The construction and operation of the brake of FIG. 3 is otherwise the same as that of FIGS. 1 and 2 and corresponding reference numerals have been applied to corresponding parts.

Our invention has the advantage that the actuator can be arranged at any convenient attitude with respect to the housing 1 in accordance with the availability of space. For example, in the embodiment of FIGS. 1 and 2, since the tappets 19 and 20 are circular they will automatically adopt an appropriate angular position relative to the bores 21 and 22 consistent with the direction of the applied force from the wedge with the tappets being rotatable, as necessary, about the axes of the bores 21 and 22 as their axes. Similarly, in the embodiment of FIG. 3, the tappets 35 are free to move angularly with respect to the adjusters 36. That is to say the tappets 35 can rotate as necessary about the axes of the bores in the lugs 8 and 9 in which they are housed.

I claim:

1. A self-energising disc brake for a vehicle comprising a first stationary housing, axially spaced radial surfaces in said housing, spaced rotatable friction discs in said housing, pilots on said housing, spreading pressure plates in said housing between said friction discs and centered by said pilots, an actuator for moving said pressure plates angularly in opposite directions, camming means for separating said plates axially to urge said friction discs axially and into engagement with said radial surfaces when said plates are initially moved angularly in said opposite directions by said actuator and thereafter carried round with said friction discs, a stop abutment in said housing, a stop lug on one of said pressure plates for engagement with said stop abutment to arrest movement of the said one plate so constructed and arranged so that continued angular movement of the other of said pressure plates provides a servo action, and radially projecting actuator lugs on said plates, said actuator comprising a second housing, transmission means movable into an operative advanced position to urged said radially projecting actuator lugs on said pressure plates away from each other, a compression spring surrounding said second housing for urging said transmission means into said advanced position, said second housing having a cylinder bore, and a piston working in said cylinder bore, said cylinder bore and said piston being both of stepped outline with the inner end of said piston being of smaller diameter, the outer end of said piston projecting from said bore, a chamber defined in said bore between the steps in diameter, said second housing having a passage through which said chamber may be pressurised, the smaller diameter inner end of said piston acting on said transmission means to urge it into a retracted position in opposition to the force in said spring when said chamber is pressurised, a thimble surrounding said second housing and acted upon by the projecting outer end of said piston, an abutment for one end of said compression spring rigid with said second housing and forming a stop for said piston when said chamber is pressurized, a radial flange on said thimble forming an abutment for the end of said spring remote from said stop, said transmission means comprising a pair of spaced tappets disposed between said actuator lugs, said tappets having outer ends acting on said actuator lugs and adjacent inner ends, a wedge acting on said inner ends and movable inwardly in a generally radial direction between said tappets to urge said actuator lugs away from each other, a pivoted connection pivotally connecting said wedge directly to the smaller end of said piston, and a pair of rollers mounted to said inner ends of said tappets between which said wedge is engageable.

* * * * *